No. 785,044. PATENTED MAR. 14, 1905.
G. E. LYNCH.
RAIL FASTENING.
APPLICATION FILED DEC. 30, 1904.
2 SHEETS—SHEET 1.
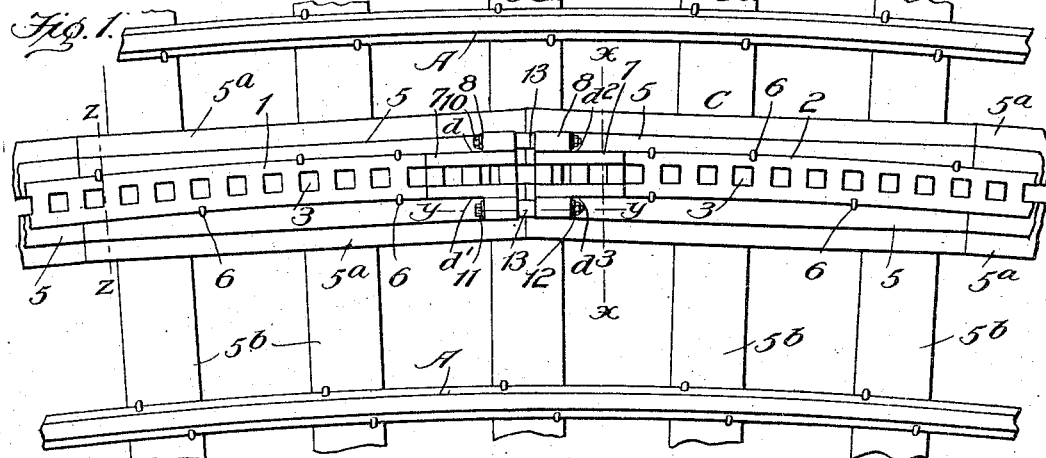
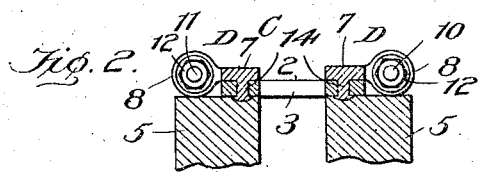
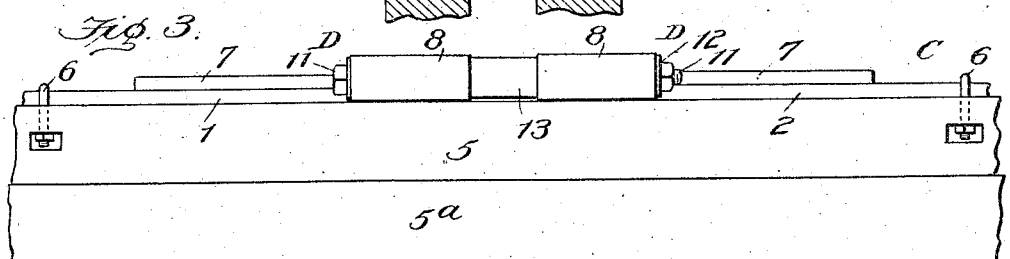
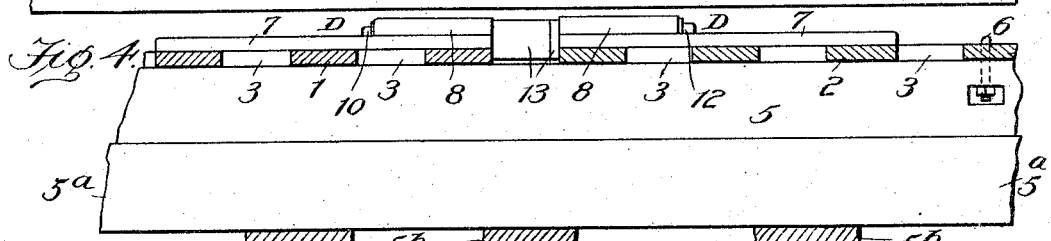
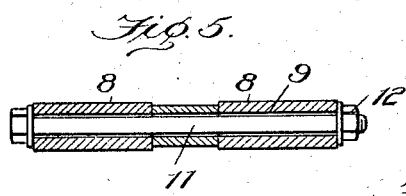
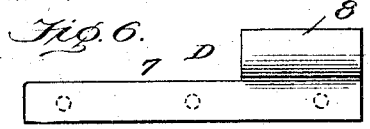
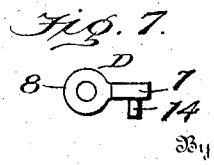
Witnesses
Edwin L. Bradford
E. G. Alexander
Inventor:
George E. Lynch
H. H. Bliss Attorney No. 785,044. PATENTED MAR. 14, 1905.
G. E. LYNCH.
RAIL FASTENING.
APPLICATION FILED DEC. 30, 1904.
2 SHEETS—SHEET 2.
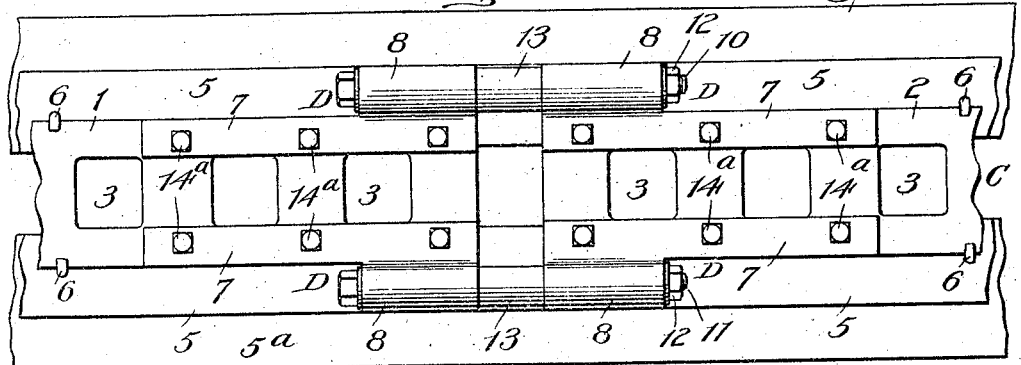
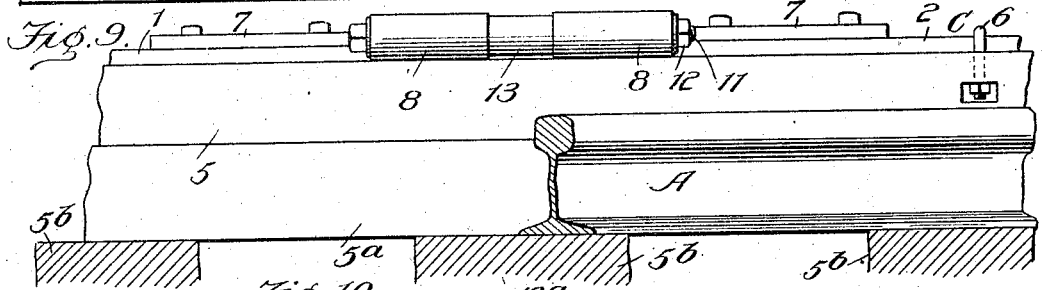
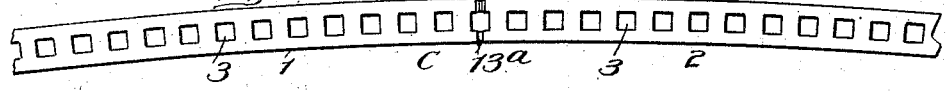
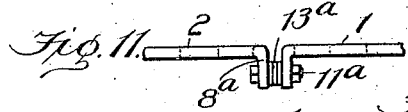
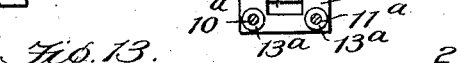
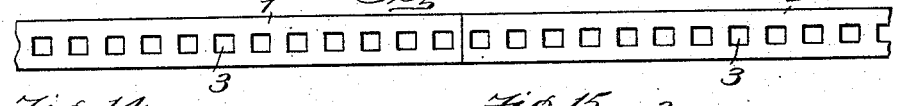
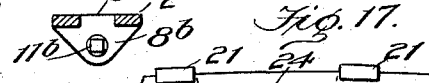
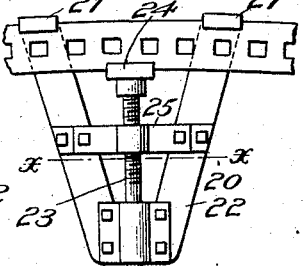
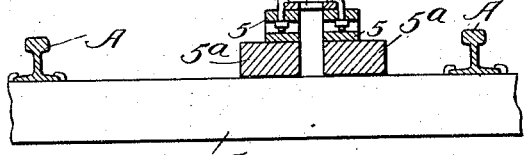
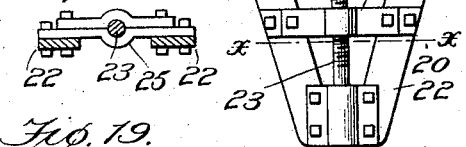
Witnesses
Edwin L. Bradford
E. R. Alexander
Inventor
George E. Lynch
By H. H. Bliss
Attorney No. 785,044. Patented March 14, 1905.

UNITED STATES PATENT OFFICE.

GEORGE E. LYNCH, OF COLUMBUS, OHIO, ASSIGNOR TO JOSEPH A. JEFFREY, OF COLUMBUS, OHIO.

RAIL-FASTENING.

SPECIFICATION forming part of Letters Patent No. 785,044, dated March 14, 1905.

Application filed December 30, 1904. Serial No. 239,027.

*To all whom it may concern:*

Be it known that I, GEORGE E. LYNCH, a citizen of the United States, residing at Columbus, in the county of Franklin and State of Ohio, have invented certain new and useful Improvements in Rack-Railways, of which the following is a specification, reference being had therein to the accompanying drawings.

This invention relates to improvements in the rack-rail element of railway-rack construction, it pertaining more particularly to improvements in the devices for connecting together the adjacent ends of two neighboring sections of the rack.

Heretofore various plans and devices have been suggested for holding in line or securing together the successive sections of the rack. In some cases they have been joined or locked together by means of chairs, on which the rack-sections rest, and provision being made of interlocking devices, such as lugs on one part and socket-shoulders on the other. In other cases use has been made of fish-plates substantially similar to those used in connecting up the rails of an ordinary railway-track— that is to say, the rack-sections have been joined each to the next by plates overlapping to some extent the end part of each of two neighboring sections and secured thereto by bolts; but in these earlier structures the bolts were arranged on lines transverse to the longitudinal lines of the rack-sections, the bolts being either vertical or horizontal.

I have found that superior results and marked advantages are attained by having the connecting devices arranged on lines parallel to the longitudinal lines of the rack, as will be understood from the drawings and the description given below.

Figure 1 is a top plan view of a portion of a railway having a rack structure sufficient to illustrate the manner of employing my improvements. Fig. 2 is a cross-section. Fig. 3 is a side view of parts of two adjacent rack-rails and of the connecting devices. Fig. 4 is a longitudinal section. Fig. 5 is a longitudinal section on the line $y\, y$ in Fig. 1. Fig. 6 is a plan view of one of the joint-castings detached. Fig. 7 is an end view of the same. Fig. 8 is a plan view of a modified form of connecting device. Fig. 9 is a side view of the same. Fig. 10 shows another modification of joint. Fig. 11 is a side elevation. Fig. 12 is a cross-section of the same. Fig. 13 is a plan. Fig. 14 is a side view, and Fig. 15 is a cross-section, of another modification. Fig. 16 is a cross-section on the line $z\, z$ of Fig. 1. Figs. 17, 18, and 19 illustrate more or less conventionally a tool which can be used for giving to the rack-rail sections more or less of a lateral curvature at points between their extremities.

In the drawings, in Figs. 1 to 7, I have shown at A A parts of the ordinary track-rails of a railway system wherein my improvements can be embodied. The locomotive and cars are supported on these rails, they having flanged wheels of any suitable type.

The rack-rail or sprocket-rail, which is combined with these ordinary track-rails, is indicated as an entirety by C. It is built up of sections such as indicated at 1 2. They are formed of sheet metal of suitable thickness and width. In each there are formed apertures 3, these being spaced each from the next at equal distances. These apertures receive the teeth of the rack-wheel or sprocket-wheel, which is mounted on the locomotive and which by means of said teeth engages with the rail and exerts tractive effort thereon in propelling the locomotive and such train of cars as may be connected therewith. These sections 1 2, &c., of rack-rail are supported upon longitudinal sills 5 5, which are placed between the main track-rails A A, these resting on beams $5^a$, which are placed on the ties $5^b\, 5^b$. The rack-rail sections 1 2, &c., extend inward beyond the inner edges of the stringers or beams and are fastened thereto at suitably-frequent intervals by means of headed spikes 6.

The ends of each rail-section 1 2 of the line are secured to the adjacent ends of the neighboring sections, as follows: D indicates a casting. It is formed with an elongated bar-like part 7 and a tubular part 8. The latter is at one end of the bar 7 and projects laterally therefrom. It is formed either when casting or by drilling with an aperture 9. Four of these castings are shown, they being counterparts each of the other. They are arranged in relation to each other and in relation to the rail-sections in the manner shown in Fig. 1. The four castings which constitute one of the joints I have indicated by $d\ d'.\ d^2\ d^3$. Those shown at $d\ d'$ are opposite to each other and have their bars 7 laid upon and secured to the side parts of the end of one of the rail-sections. Those at $d^2\ d^3$ are similarly arranged opposite to each other and are secured to the other adjacent rail-section 2. The tubes 8 of the four castings are brought into the relative positions illustrated, the apertures 9 in those on the right-hand side coming to alinement and the apertures in those on the left coming similarly to a common line. Bolts 10 and 11 are passed horizontally through the tubular projections and secured by nuts and locking-washers at 12. In this way a firm clamping and fastening are effected for holding one rail-section to the next.

It will be seen that there are no bars or plates overlapping from one section to the next, and consequently the rack-rail or rail-sections can be secured either directly in one continuous line or can be so arranged each relative to the next that a curved line can be followed, as shown in Fig. 1. When it is desired to impart a curvature to a line of the rack, the bolt at 10 or that at 11 is loosened, and thimbles or spacing-washers of the desired thickness, as shown at 13, are introduced, so that when the bolt is again put in place and drawn tightly into position the ears or tubes 8 will be held apart and the rack-sections will be thrown out of line to an extent corresponding to the separation of the ears. It will be further seen that the rack-rail can be constructed at the shops in complete sections with parts D attached and shipped to distant points, where they can be assembled and fastened readily and rapidly, the only requisite at the place of track erection being that bolts 10 and 11 shall be inserted, together with such washers as may be desired, at the places of curvature in the track.

By having the four parts $d\ d'\ d^2\ d^3$ counterparts of each other their construction is simplified, the whole rack system comprising only similar rail-sections 1 2, &c., and similar castings D in such number as required. These may be secured together at the shops prior to shipment to the mine or other place where the railway system is to be erected.

The castings may be secured to the rail-sections 1 2, &c., by means of rivet-lugs 14 formed on the castings, these being adapted to pass through apertures in the rail-sections and to have their ends upset or riveted, so as to effect a firm fastening. There are advantages incident to fastening by means of these vertical rivets in contrast with vertically-arranged bolts, because the upset metal tends to fill the apertures in the rail-sections and prevents any longitudinal slip in either direction, such as is liable to occur when bolts are passed through apertures. The slippage is undesirable because of its altering the desired relations of the rail-sections to each other.

It will be seen that the tube part or bolt-receiving projection 8 of each casting is on an axis lying in the central longitudinal horizontal plane of its bar 7, this permitting the same casting to be used in either one of the four positions shown at $d\ d'\ d^2\ d^3$. It is in these respects also that the longitudinally-arranged connecting-bolts 10 and 11 are superior to those which are arranged transversely to the rails, as in earlier structures, inasmuch as after bolts are arranged as those herein shown and have been finally set in firm position it is practically impossible to shift the rail-sections by slippage under the strain of a heavy draft. It will be understood that the locomotives or power-vehicles used on a railway structure of this class are themselves exceedingly heavy and upon an incline exert excessive tractive effort and in addition to that are frequently loaded with long trains of cars or of vehicles, each of which also carries its heavy load. One of the purposes of the present invention is to provide a connection between each rack-section and the next of such nature that any part of the stress in a longitudinal direction felt by any rack-section and exceeding the resisting grip of its spikes shall be transmitted to the others of the series through longitudinally-arranged connecting devices which are unyielding in longitudinal directions. This part of the invention can be attained without following all of the details which I have above described as being incident to the form of connecting device which I at present prefer. Thus in Figs. 8 and 9 I have shown how the bar parts 7 of the connecting devices can be secured to their rack-sections by means of bolts $14^a$.

In Figs. 10, 11, and 12 I have illustrated a construction in which the laterally-extending projections on the rack-sections which receive the longitudinally-arranged fastening devices are integral with the sections. They may be made by turning down a part at each end of each section, as at $8^a$, placing variable washers or liners $13^a$ between the turned-down parts, and powerfully binding them together by means of the longitudinally-arranged bolts at $10^a$ and $11^a$. In such case any rail-section and that adjacent to it can be set in the same line or at an inclination to each other and fastened firmly in place in the manner above described by varying the number or thickness of the liners on one line of fastening in comparison with those on the other line.

In Figs. 13, 14, and 15 I illustrate a construction in which one of the above-described advantages is retained while another is not, in this case there being but a single longitudinally-arranged fastening device $11^b$ in the central vertical longitudinal plane of the rack engaging with the laterally-extending projections 8ᵇ of the rails. In either of the cases last referred to the rail-sections can at their ends be fixed properly and with accuracy in relation to the sprocket-wheel or rack-wheel carried by the locomotive, so that it will roll smoothly and efficiently from one section to the next, as either of these devices for uniting the rails permits me to employ the spacing washers or liners or equivalents for having the successive sprocket-apertures brought to the proper points and there rigidly held.

Any suitable tool or implement can be used for imparting a lateral curvature to the sections of the rack-rail, it being preferable, in addition to the variable spacing devices above described, to give a slight bend to the metal, as shown in Figs. 1 and 10. In Figs. 17, 18, and 19 an implement is illustrated for this purpose. 20 is a frame or carrier having abutments at 21 and supporting-arms 22, on which can be placed one of the rack-rail sections. 23 is a screw-rod with a presser-head 24, the rod being threaded and fitted to a nut at 25. At 26 there is a power device—such as a ratchet-lever, hand-wheel, or the like—for rotating the threaded rod in the nut and advancing it toward the rack-section and driving the presser-head 24 against the edge of the rail on transverse lines between those of the stops 21. When pressure is thus applied to the edge of the rail, it will be bent laterally. After sufficient bending has been accomplished at one point the tool is loosened and slipped along the rail and the bending pressure is again applied.

I do not limit myself to the detail shown and described. Modifications can be made in either of several respects, as in the shapes, dimensions, and relative arrangements of the parts 7 8 10 11 12 13, &c. While the lugs, ears, or projections 8 are shown as having their longitudinal axes in or approximately in the planes of the plate 7, they may be otherwise arranged without departing from the invention. Instead of being closed tubes the bolt-holders may be lugs or projections with apertures or bolt cavities of other sorts.

What I claim is—

1. In a railway-rack structure, a rack-rail section having a lug or projection near its end, in combination with an adjacent rack-rail section having an opposing lug near its end, and a connecting rod or bolt arranged approximately parallel to the rack-sections and holding together the two sections by longitudinal stress, as set forth.

2. In a railway-rack structure, a rack-rail section having a laterally-extending lug or projection at or near its end, in combination with an adjacent rack-rail section having a laterally-extending lug or projection near its end, variable spacing devices, and a pin or bolt approximately parallel to the rail-sections and clamping together the spacing devices and rail-sections, substantially as set forth.

3. In a railway-rack structure, the combination with a rack-rail section, and a second rack-rail section adjacent thereto and adapted to be placed in line therewith or at an inclination thereto, of joining devices connecting said sections and arranged to exert longitudinal stresses thereon either while in line with each other or when situated at an angle to each other, substantially as set forth.

4. In a railway-rack structure, the combination with a rack-rail section having at its end a lateral projection, and a second rack-rail section adjacent thereto and having a laterally-extending projection, of a variable spacing device between said rack-sections, and means for fastening rigidly together the said rack-sections and said fastening and spacing devices, substantially as set forth.

5. In a railway-rack structure, the combination with two adjacent rack-rail sections, of a connecting device for said rack-rail sections consisting of one or more pins or rods situated substantially parallel to the rack-sections and engaging with each of said sections, and means for causing said pins or rods to exert longitudinal stress upon the said rack-sections and for fastening the sections immovably in relative positions, substantially as set forth.

6. In a railway-rack structure, the combination of a rack-section, a bar secured by riveting to the said rack-section, a second rack-section adjacent to that aforesaid and having a bar riveted to said second section, a pin or bolt engaging with each of said bars and adapted to adjustably draw them on lines longitudinal of the rail-sections, substantially as set forth.

7. In a railway-rack structure, the combination of a rack-section, an adjacent rack-section, and two sets of connecting devices for joining one end of one section to one end of the adjacent section, said sets being on different lines longitudinally of the rack and each of said sets comprising means for spacing or holding apart the said sections, and means for drawing them together and clamping the rack-sections and the spacing devices together, substantially as set forth.

8. In a railway-rack structure, the combination of a rack-rail section having at its end two tubular ears or projections on different longitudinal lines, a second rack-section adjacent thereto and having at its adjacent end two tubular ears on longitudinal lines, two independent bolts or draft-rods adapted each to draw together a pair of said tubular ears or projections and to be independently adjusted, substantially as set forth.

9. In a railway-rack structure, the combination of a rail-section having at its end two similar lugs or projections on different longitudinal lines, a second rack-section adjacent thereto having at its end two similar lugs or projections, said rack-sections being adapted to lie in alinement with each other or at an inclination to each other, and two fastening-bolts engaging with two opposing lugs or projections and adapted to draw toward each other, on lines longitudinal of the rack-sections, the projections with which it engages, whether the rack-sections are in line or at an inclination to each other, substantially as set forth.

10. A rack-rail section, for a railway-rack structure, consisting of a bar or plate formed with apertures or a series of sprocket-engaging devices and having at each end two lugs or projections each adapted to engage with a bolt situated longitudinally of the rack-section, substantially as set forth.

11. A rack-rail section for a railway-rack structure consisting of a bar or plate of sheet metal having sprocket-apertures cut or punched therein and having at each end two opposite cast lugs or projections formed separately from the bar and rigidly secured thereto, and portable therewith, and adapted to be rigidly connected to similar rack-sections by bolts or draft devices acting lengthwise of the said rack-sections, substantially as set forth.

12. A rack-rail section for a rack-railway consisting of a bar or plate of sheet metal having sprocket-apertures cut or punched therein, and having at each end a cast lug or projection formed separately from the bar, and rigidly secured thereto, and provided with a suitable bolt-seat arranged to support a bolt lying substantially parallel to the rack-rail section, substantially as set forth.

13. In a railway-rack structure, the combination with a rack-rail section 1, provided with a bolt-supporting device at the end, having a bolt aperture or cavity adapted to hold a bolt on a line longitudinal to the rack-section, of the rack-section 2, having at its end a bolt-supporting device formed with a bolt aperture or cavity adapted to aline with the bolt-holding device on the rack-section 1, and the bolt engaging with and adapted to draw toward each other the bolt-holding devices, substantially as set forth.

14. The herein-described device for fastening one rack-rail section to another, having the bar or plate 7, adapted to be detachably secured to a rack-rail section, and the offset bolt-holding device 8 integral with said bar or plate 7, substantially as set forth.

15. A device for fastening one rack-rail section to another having a plate or bar 7, adapted to be detachably secured to a rack-rail section, and an ear, lug or projection integral therewith and extending from said plate or bar 7, and adapted to be connected by a bolt or pin with a corresponding lug or ear secured to an adjacent rail-section, substantially as set forth.

16. A joining device for securing one rack-rail section to another, having the plate or bar 7, and the bolt-supporting ear or lug 8, projecting laterally from said plate, said lug or ear being arranged substantially as set forth whereby the plate can have either of its faces in contact with the rail-section when secured thereto and can be secured to either side of the rail.

In testimony whereof I affix my signature in presence of two witnesses.

GEORGE E. LYNCH.

Witnesses:
F. E. VAN SLYKE,
C. L. McCONKEY.